United States Patent [19]

Iwaki et al.

[11] Patent Number: 4,680,680
[45] Date of Patent: Jul. 14, 1987

[54] COMBINATION VEHICLE LAMP DEVICE

[75] Inventors: Akihiro Iwaki, Ichihara; Masayoshi Tajima, Tokyo, both of Japan

[73] Assignee: Stanley Electric Co., Ltd., Tokyo, Japan

[21] Appl. No.: 871,074

[22] Filed: Jun. 5, 1986

[30] Foreign Application Priority Data

Jun. 14, 1985 [JP] Japan .................. 60-89909

[51] Int. Cl.$^4$ .................................. B60Q 1/26
[52] U.S. Cl. ................................. 362/80; 362/61;
362/231; 362/268; 362/327; 340/67; 340/94
[58] Field of Search ............. 340/66, 67, 71, 72,
340/94; 362/61, 80, 83, 242–244, 231, 268, 293,
328, 331, 327

[56] References Cited

U.S. PATENT DOCUMENTS

| 2,783,452 | 2/1957 | Falge et al. | 340/73 |
| 3,109,159 | 10/1963 | Jordan et al. | 340/67 |
| 4,488,207 | 12/1984 | Harmon | 362/231 |
| 4,532,578 | 7/1985 | Gaden et al. | 362/83 |

FOREIGN PATENT DOCUMENTS

| 1217810 | 5/1966 | Fed. Rep. of Germany | 362/80 |
| 2647090 | 4/1978 | Fed. Rep. of Germany | 362/80 |
| 54-39982 | 3/1979 | Japan | 362/243 |

Primary Examiner—Larry Jones
Assistant Examiner—Allen J. Flanigan
Attorney, Agent, or Firm—Frishauf, Holtz, Goodman & Woodward

[57] ABSTRACT

A combination vehicle lamp device for motor vehicles, including a single housing having an outer lens. The housing is divided into plural chambers for effecting plural light indications. A central chamber located at the central portion of the housing is divided into small chambers by a wall having a Y-shaped section and a red-color lens, plural lamps being disposed in the small chambers respectively. Inclined lenses are provided for reflecting or refracting the light emitted from one of the plural lamps in the small chambers of the central chamber in the forward direction at both side chambers adjacent to the central chamber respectively, each of the inclined lenses being disposed in a slanted-relation to the optical axis in each of the side chambers. A lamp is disposed at the back side of one of the inclined lenses with an amber-color lens therebetween, and a lamp is disposed at the back side of the other of the inclined lenses with a clear lens therebetween, and the light emitted from each of these lamps being emitted in the forward direction through each of the respective inclined lenses.

19 Claims, 8 Drawing Figures

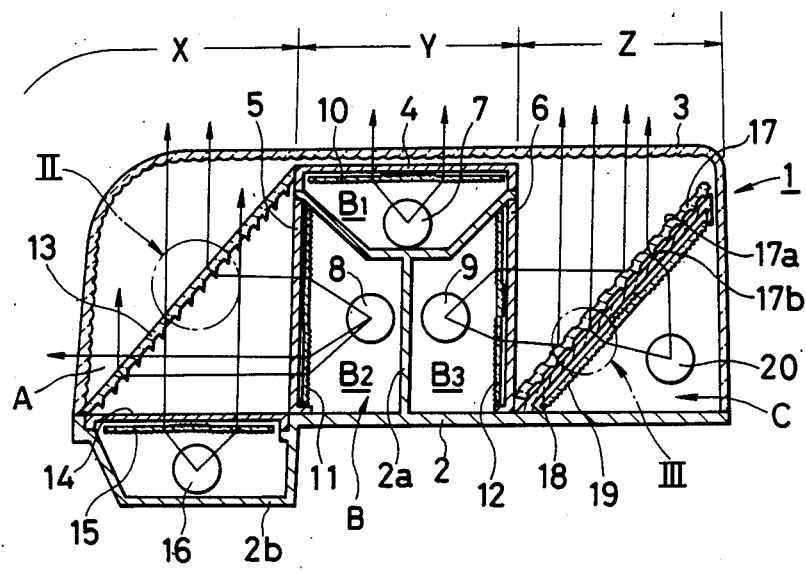
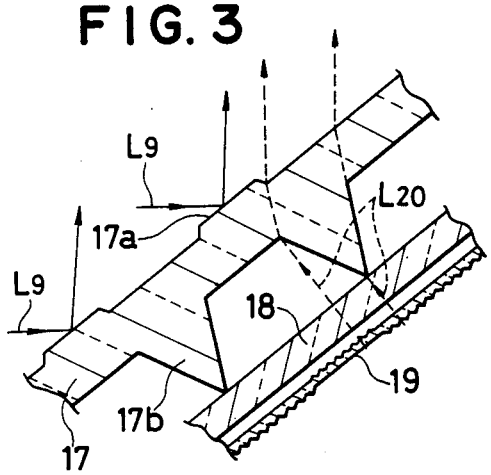
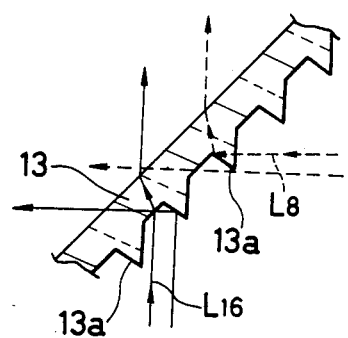

FIG. 4 (I)
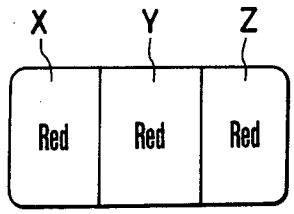
FIG. 4 (II)
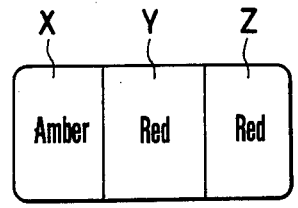
FIG. 4 (III)
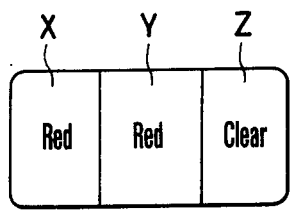
FIG. 4 (IV)
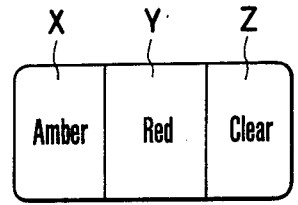
FIG. 5 (PRIOR ART)
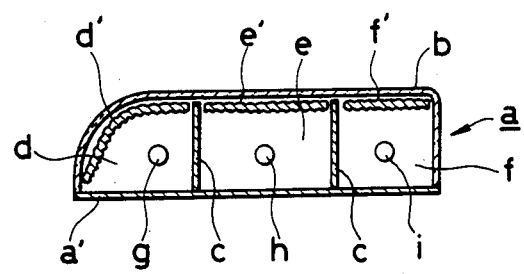

{ 4,680,680 }

COMBINATION VEHICLE LAMP DEVICE

BACKGROUND OF THE INVENTION (1) Field of the invention

The present invention relates to a vehicle lamp device for motor vehicles, and more particularly to a combination lamp in which there are provided a plurality of lamps each of which has a different indication function, such as a tail lamp, a stop lamp and a blinking lamp, in a single housing.

(2) Description of the prior art

Referring to FIG. 5 a conventional combination lamp device is shown. In the conventional combination lamp device a, a transparent and non-colored outer lens b is mounted on a lamp base a', and the inside portion of the lamp device a is divided into three sections d, e and f by using two walls c made of a light blocking material. The section d located at the left hand side in FIG. 5 is adapted to be used for a blinking signal lamp g, and there is disposed an amber inner lens d' at the inside of the outer lens b. The section e located at the center of the lamp base a' is adapted to be used for a tail and stop lamp h, and there is disposed a red inner lens e' at the center section e. The section f located at the right hand side in FIG. 5 is adapted to be used for a back-up i, and there is disposed a clear color inner lens f' at the right section f. The lamps g, h and i are disposed in the sections d, e and f respectively, for being actuated by current from an electric power source independently to indicate the respective functions.

In the above described conventional lamp device, since the lamp base a' is divided into plural sections by using the light-insulating or blocking walls for effecting plural indications, each section should be fixedly used for each indicating function. However, the space for installing the lamp device of this type is usually limited to a comparatively small area of a motor vehicle, and therefore, it is necessary to share plural sections within the limited small area. For example, to increase the illumination surface at the central section for the tail and stop lamp h to thereby increase the visual performance by which one can easily acknowledge the illumination light from the illumination surface, both areas of the illumination surfaces for the blinking signal lamp and the back-up lamp should be undesirably decreased respectively.

OBJECTS OF THE INVENTION

A main object of the present invention is to provide a vehicle lamp device for motor vehicles in which the area of the illumination surface for the actuated illumination lamp can be increased, thereby increasing the visual performance, without increasing the size of the vehicle lamp device per se.

Another object of the present invention is to provide a vehicle lamp device for motor vehicles in which illumination surfaces are independently obtained for increasing the visual performance of each lamp, without any interference of light when plural lamps are actuated and without increasing the size of the vehicle lamp device per se.

SUMMARY OF THE INVENTION

According to the present invention, in order to achieve the above-mentioned objects of the present invention, there is provided a vehicle lamp device for motor vehicles, in a form of a combination lamp including a single housing having an outer lens, the housing being divided into a central and two side chambers for effecting plural indications. The central chamber located at the central portion of the housing is divided into small chambers by using a wall having a generally Y-shaped section and a red-color lens, plural lamps being disposed in the small chambers respectively. Inclined lenses are provided in the side chambers, respectively, for reflecting or refracting the light emitted from a respective one of the plural lamps in the small chambers of the central chamber in the forward direction, each of the inclined lenses being disposed in an inclined relation to the optical axis in each of the side chambers. A lamp is disposed at the back side of one of the inclined lenses through an amber-color lens, and a lamp is disposed at the back side of the other of the inclined lenses through a clear lens, the light emitted from each of the lamps being emitted in the forward direction through each of the inclined lenses. The central chamber comprised of the plural small chambers is used for a tail and stop lamp, because the light emitted from the tail and stop lamp requires a very high visual performance. The side chamber provided with the amber-color lens is used for the blinking signal lamp, and the side chamber provided with the clear lens is used for the back-up lamp. When all of the plural lamps disposed in the small chambers of the central chamber are actuated, all of the illumination surfaces of the central and side chambers are illuminated with red color, thereby increasing the visual performance for the tail and stop lamp. When the blinking signal lamp is actuated, the lamp located in the small chamber opposite to the blinking signal lamp is automatically deenergized and the illumination surfaces of the central chamber and the side chamber of the back lamp emit red light as an indication of tail and stop, thereby increasing the visual performance of the tail and stop indication in comparison with the visual performance due to only the illumination surface of the central chamber. Furthermore, when the back-up lamp is energized, the lamp located at the small chamber opposite to the back-up lamp is automatically deenergized, and the illumination surfaces of the central chamber and the side chamber of the blinking signal lamp emit red light as an indication of tail and stop, thereby increasing the visual performance of the tail and stop indication in comparison with the visual performance due to only the illumination surface of the central chamber.

BRIEF DESCRIPTION OF THE DRAWINGS

Other features, additional objects, and many of the attendant advantages of the present invention will readily be appreciated as the same becomes better understood by reference to the following detailed description of a preferred embodiment when considered in connection with the appended drawing in which:

FIG. 1 is a sectional view showing an embodiment of the vehicle lamp device for motor vehicles in the form of a combination lamp, of the present invention;

FIG. 2 is an enlarged sectional view of the portion designated II in FIG. 1;

FIG. 3 is an enlarged sectional view showing the portion designated III in FIG. 1;

FIGS. 4 (I) to 4 (IV) are plan views of the vehicle lamp device of the present invention showing the illumination light colors emitted from the illumination surfaces of the central chamber and both side chambers, when the lamps are selectively energized, and FIG. 5 is a schematic sectional view showing a conventional combination vehicle lamp device for motor vehicles.

DETAILED DESCRIPTION OF THE INVENTION

Referring now to FIGS. 1 to 4, a preferred embodiment of the vehicle lamp device for motor vehicles of the present invention is explained in detail hereinafter.

FIG. 1 illustrates a combination lamp 1 comprising a single housing 2 and an outer lens 3 made of a transparent and non-colored material covering the front surface of the housing 2. The housing 2 of the combination lamp 1 is divided into three main chambers A, B and C adapted to be used for a blinking signal lamp, a tail and stop lamp and a back-up lamp respectively.

The chamber B located at the central portion of the housing 2 is divided into three small chambers $B_1$, $B_2$ and $B_3$ by means of a wall 2a having an approximately Y-shaped section and formed integrally with the housing 2 at the central portion of the housing 2. Three red-color lenses 4, 5 and 6 are provided around chamber B. There are disposed three lamps 7, 8 and 9 in the small chambers $B_1$, $B_2$ and $B_3$ respectively, and inner lenses 10, 11 and 12 are disposed inside the red-color lenses 4, 5 and 6 respectively. Each of the inner lenses 10, 11 and 12 is formed as a Fresnel lens in order to make the light emitted from each of the lamps 7, 8 and 9 into parallel light rays.

The chamber A located at the left hand side in FIG. 1 has a rearwardly projecting portion 2b at the back side thereof. Therefore, the space of the chamber A is comparatively larger than that of the other chambers B and C. In chamber A there is disposed a first inclined lens 13 made of a transparent and non-colored material which is arranged in a slanted relation to the forward direction. At the back surface of the lens 13, there is provided a lens cut portion 13a as shown in FIG. 2, and the cut surface of the lens cut portion 13a is facing the small chamber $B_2$ of the central chamber B. The lens 13 is disposed within the chamber A with an angle of about 45° with respect to the red-color lens 5 of the small chamber $B_2$. There are disposed an amber-color lens 14 and an inner lens 15 formed as a Fresnel lens in the chamber A, and the light emitted from a lamp 16 installed in the rearwardly projecting portion 2b is transmitted to the first lens 13 through the amber-color lens 14 and the inner lens 15.

According to the first lens 13 thus constituted, a part of the light $L_8$ (see FIG. 2) emitted from the lamp 8 in the small chamber $B_2$ of the central chamber B is directed to the forward surface of chamber A by an internal reflection and a refraction due to the lens 13 as shown in FIG. 2, and a part of the light $L_8$ passes through the first lens 13 to emit light from the left side surface of the chamber A as shown in FIG. 2.

The light passing through the front surface and the side surface of chamber A is observed as a red light because the light passes through the red-color lens 5, thereby effecting the tail and stop indication.

On the other hand, a large part of the light $L_{16}$ emitted from the lamp 16 installed in the rearwardly projecting portion 2b is emitted to the forward or front surface of chamber A by passing through the first inclined lens 13 as shown in FIG. 2, but a part of the light $L_{16}$ is reflected by the lens cut portion 13a of the first inclined lens 13 to the side surface. In this case, since the light $L_{16}$ passes through the amber-color lens 14, the light is observed as an amber color, thereby effecting the blinking indication.

In the chamber C located at the right hand side in FIG. 1, there is provided a second inclined lens 17 arranged in a slanted-relation. The second inclined lens 17 comprises, as seen in FIG. 3, reflecting portions 17a in the form of a trapezoid at the front surface and lens cut portions 17b in a prism formation at the back surface, the reflecting portions 17a being opposite to the red-color lens 6 of the small chamber $B_3$ of the central chamber B with an angle of about 45°. There are provided a clear lens 18 and an inner Fresnel lens 19 opposite to the back surface of the second inclined lens 17 and a lamp 20 is installed at the back side of the inner lens 19.

According to the second lens 17 thus constituted, the light $L_9$ (FIG. 3) emitted from the lamp 9 in the small chamber $B_3$ of the central chamber B is directed to the forward surface of chamber C by being reflected on the reflecting portions 17A as shown in FIG. 3, thereby effecting the tail and stop indication. The light $L_{20}$ emitted from the lamp 20 passes through the inner lens 19 and the clear lens 18 and passes through the second inclined lens 17 through the lens cut portions 17b and is emitted toward the forward surface of chamber C, thereby effecting the back-up indication.

According to the above-described vehicle lamp device for motor vehicles, plural indications are sufficiently obtained by selectively actuating the plural lamps installed within the plural chambers.

For example, when the lamps 7, 8 and 9 in the central chamber B are energized for the tail and stop indication, the light emitted from the lamp 7 passes through the inner lens 10 by which the light becomes a substantially parallel light ray and, the red-color lens 4. Therefore, the light from the lamp 7 is emitted as red light from the area of the illumination surface shown by Y in FIGS. 1 and 4 (I). The light emitted from the lamp 8 in the small chamber $B_2$ passes through the inner lens 11 and the red-color lens 5 and then is refracted by the first inclined lens 13 so as to be directed to the forward surface. Therefore, the light from the lamp 8 is emitted as red light from the area of the illumination surface shown by X in FIGS. 1 and 4 (I). Similarly, the light emitted from the lamp 9 in the small chamber $B_3$ passes through the inner lens 12 and the red-color lens 6 and then is reflected by the reflecting portions 17a of the second inclined lens 17 so as to be directed to the forward surface. Therefore, the light from the lamp 9 is emitted as red light from the area of the illumination surface shown by Z in FIGS. 1 and 4 (I). As mentioned above, during normal running of the motor vehicle, all of the illumination surfaces of all of the chambers A, B and C are effectively used for the tail and stop indication as shown in FIG. 4 (I), thereby increasing the visual performance.

In this condition, if the motor vehicle is to turn to the left or the right direction, a switch for controlling the blinking signal lamp is operated to energize the blinking signal lamp 16. At this time the lamp 8 is automatically deenergized by an electric circuit. Upon energization of the lamp 16, the light emitted from the lamp 16 mounted at the rearwardly projecting portion 2b passes through the inner lens 15 and the amber-color lens 14 and then transmits through the first inclined lens 13 so as to be directed to the forward and left side surfaces. Therefore, the light from the lamp 16 is emitted from the area of the illumination surface shown by X in FIG. 4 (II) to thereby effect a blinking indication. Even in this condition, not only the area Y but also the area Z may be illuminated with red light (by lamps 7 and 9 as described above). Therefore, the tail and stop indication may be sufficiently effected.

Furthermore, when the motor vehicle moves backwardly, the above-mentioned electric circuit controls the lamps 20 and 9 such that the lamp 20 is energized but the lamp 9 is deenergized. Upon energization of the lamp 20, the light emitted from the lamp 20 passes through the inner lens 19 and the clear lens 18 and then is refracted by the second inclined lens 17 so as to be directed to the forward surface. Therefore, the light from the lamp 20 is emitted from the area of the illumination surface shown by Z as shown in FIGS. 1 and 4 (III). Even in this condition, not only the area Y but also the area X may be illuminated with red light (by lamps 7 and 8 as described above). Therefore, the tail and stop indication may be sufficiently achieved.

When the motor vehicle turns to the left or the right direction and simultaneously moves backwardly, the lamps 7, 16 and 20 are energized and the lamps 8 and 9 are deenergized. Therefore, the blinking indication is effected by the illumination light with red color emitted from the area Y, and the back-up indication is achieved by the illumination light with clear color emitted from the area Z. Thus, all of indications are surely achieved.

As mentioned above, according to the combination vehicle lamp device for motor vehicles of the present invention, the area for effecting the tail and stop indication, which area requires a very high visual performance, is increased by two or three times (depending upon circumstances), thereby increasing the visual performance without increasing the size of the vehicle lamp device per se.

Furthermore, the areas for effecting the blinking indication and the back-up indication are not decreased even by increasing the area for effecting the tail and stop indication. Therefore, all of indications can be surely achieved.

What is claimed is:

1. A combination-type vehicle lamp device for motor vehicles, comprising:
   a single housing;
   an outer lens mounted on said housing;
   said housing being divided into plural chambers for effecting plural light indications, said chambers including a central chamber located at a central portion of said housing and two side chambers;
   a generally Y-shaped wall in said central chamber for dividing said central chamber into a plurality of small chambers, said small chambers including a first forward-facing small chamber facing said outer lens and two side-facing small chambers facing in opposite directions toward respective side chambers of said housing;
   at least one respective lamp being disposed in each of said small chambers;
   red color lenses arranged to color red the light emitted by each of said respective lamps in said small chambers of said central chamber;
   first and second inclined lenses respectively arranged in said side chambers of said housing for reflecting or refracting light emitted from respective ones of said plural lamps in said side-facing small chambers of said central chamber in the forward direction of said outer lenses, each of said inclined lenses being disposed inclined to an optical axis in each of said side chambers of said housing;
   a first lamp disposed at the back side of one of said inclined lenses with an amber-color lens therebetween, said first lamp being in the side chamber in which its associated inclined lens is arranged;
   a second lamp disposed at the back side of the other of said inclined lenses with a clear lens therebetween, said second lamp being in the side chamber in which its associated inclined lens is arranged;
   light emitted from each of said first and second lamps being emitted in the forward direction toward said outer lens through each of said respective inclined lenses.

2. The vehicle lamp device of claim 1, wherein said illumination surface for a given type of illumination indication is increased by selectively energizing said plural lamps mounted in said small chambers of said central chamber and both side chambers.

3. The vehicle lamp device of claim 1, comprising inner lenses at the inside portion of said red-color lens, said amber-color lens and said clear lens respectively.

4. The vehicle lamp device of claim 3, wherein said inner lenses are respective lenses for making light passing therethrough into parallel light beams.

5. The vehicle lamp device of claim 4, wherein said inner lenses are respective Fresnel lenses.

6. The vehicle lamp device of claim 1, wherein said inclined lenses are inclined at an angle of substantially 45°.

7. The vehicle lamp device of claim 1, wherein said side chamber provided with said amber-color lens comprises a blinking signal indication lamp, and wherein the other side chamber provided with said clear lens comprises a back-up signal indication lamp.

8. The vehicle lamp device of claim 7, wherein said central chamber and at least one of said side chambers serves as a tail and stop lamp.

9. The vehicle lamp device of claim 8, wherein all of said chambers serve as a tail and stop lamp upon energization of lamps in said central chamber.

10. The vehicle lamp device of claim 1, wherein said first inclined lens has a lens cut portion on the inner surface thereof.

11. The vehicle lamp device of claim 10, wherein said second inclined lens has a surface facing toward said forward direction and toward said central chamber, and a rearward facing surface facing towards said second lamp disposed at the back side thereof, said forward facing surface of said second inclined lens having reflecting surface portions thereon and said rearward facing surface of said second inclined lens having lens cut portions thereon.

12. The vehicle lamp device of claim 11, wherein said reflecting portions of said second inclined lens comprise trapezoidal projections thereon, and wherein said lens cut portions comprise projections in the form of a prism on said rearward facing surface.

13. The vehicle lamp device of claim 1, wherein said second inclined lens has a surface facing toward said forward direction and toward said central chamber, and a rearward facing surface facing towards said second lamp disposed at the back side thereof, said forward facing surface of said second inclined lens having reflecting surface portions thereon and said rearward facing surface of said second inclined lens having lens cut portions thereon.

14. The vehicle lamp of claim 1, wherein said red-color lenses which are arranged to color red the light emitted by each of said respective lamps in said small chambers comprises first, second and third red lenses, each of said first, second and third red lenses being arranged such that a respective lamp in each of said small chambers is interposed between a respective wall portion of said generally Y-shaped wall and a respective red lens, whereby the light emitted from each of said lamps in each of said small chambers is colored red by an associated red-color lens.

15. The vehicle lamp device of claim 14, wherein said red lenses associated with said side-facing small chambers comprise at least a portion of a wall dividing said housing into said central and side chambers.

16. The vehicle lamp device of claim 1, wherein said reflecting portions of said second inclined lens comprise trapezoidal projections thereon, and wherein said lens cut portions comprise projections in the form of a prism on said rearward facing surface.

17. A method of operating the combination-type vehicle lamp device according to claim 1, comprising:
energizing only said lamps in said small chambers of said central chamber to provide a stop and tail light indication at the forward illumination surfaces of each of said central and side chambers.

18. The method of claim 17, comprising deenergizing the lamp in the small chamber facing said side chamber having said amber-color lens therein when providing a blinking signal indication, and energizing said lamps in the other two of said small chambers to provide stop and tail indications during said blinking indication.

19. The method of claim 18, comprising deenergizing the lamp in said small chamber located facing said side chamber having said clear lens when said second lamp behind said second inclined lens is energized to provide a back-up signal indication, the lamps in the other of said small chambers being energizable to provide stop and tail light indications during said back-up signal indication.

* * * * *